United States Patent [19]

Bereiter

[11] Patent Number: 4,457,842
[45] Date of Patent: Jul. 3, 1984

[54] METHOD OF AND APPARATUS FOR SEPARATING SOLIDS FROM A FLUSHING LIQUID

[75] Inventor: Rolf Bereiter, Grabs, Switzerland

[73] Assignee: Hilti Aktiengesellschaft, Schaan, Liechtenstein

[21] Appl. No.: 398,189

[22] Filed: Jul. 14, 1982

[30] Foreign Application Priority Data

Jul. 20, 1981 [DE] Fed. Rep. of Germany ....... 3128612

[51] Int. Cl.³ .............................................. C02F 1/56
[52] U.S. Cl. ................................. 210/198.1; 210/732; 210/738; 210/206; 210/207; 210/220; 175/66; 175/206
[58] Field of Search ................... 239/602, DIG. 19; 175/66, 206; 210/702, 712, 732, 733, 734, 735, 736, 738, 167, 194, 195.1, 198.1, 206, 207, 208, 205, 220

[56] References Cited

U.S. PATENT DOCUMENTS

| | | | |
|---|---|---|---|
| 1,248,329 | 11/1917 | Hughes | 210/738 |
| 2,214,674 | 9/1940 | Hayward | 175/206 |
| 2,348,123 | 5/1944 | Green | 210/738 |
| 3,472,325 | 10/1969 | Lummus | 175/66 |
| 3,762,553 | 10/1973 | Russo | 210/208 |

FOREIGN PATENT DOCUMENTS 212463 3/1908 Fed. Rep. of Germany .

Primary Examiner—Ernest G. Therkorn
Attorney, Agent, or Firm—Toren, McGeady and Stanger

[57] ABSTRACT

In the separation of solids out of a flushing liquid such as used in flushing out boreholes and the like drilled or cut in rock, concrete, masonry and similar materials, a flocculant is added to the flushing liquid before it enters a settling tank so that the removal of the solids is accelerated. As a result, a supply of flushing liquid, free from solids, is always available from the settling tank. The flushing liquid flow is directed through the feed line into the settling tank. Before the liquid enters the settling tank it is passed in contact with a flocculant so that the liquid picks up a dosed quantity of the flocculant. To assure the optimum effect, after contacting the flocculant, the liquid is mixed and then passed into the settling tank.

7 Claims, 1 Drawing Figure

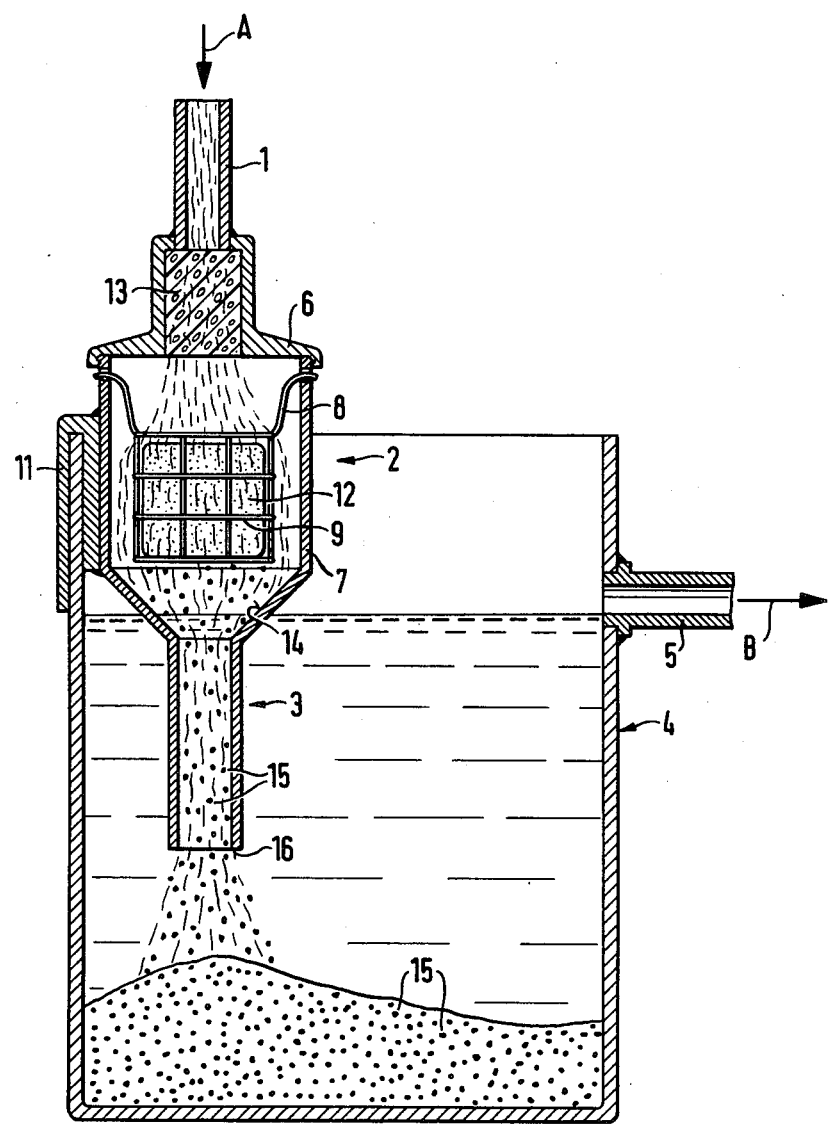

METHOD OF AND APPARATUS FOR SEPARATING SOLIDS FROM A FLUSHING LIQUID

SUMMARY OF THE INVENTION

The present invention is directed to a method of and apparatus for separating solids from a flushing liquid used for removing dust generated in the cutting or drilling of rock, concrete, masonry and the like. The flushing liquid is collected in a settling tank and the liquid is treated to effect solids separation.

Flushing liquids are used where rock, concrete, masonry and like materials are drilled or cut for removing the solid materials generated during the drilling or cutting. The solids are removed by the flushing liquid, preferably water, to a treatment site to recycle the flushing liquid or to discharge it into a sewage system without harm, the solids carried by the liquid must be separated out.

As disclosed in the West German Pat. No. 212,463, the flushing liquid used in a drilling operation is conducted into a settling tank where the solids slowly settle out onto the tank bottom. Above the layer of settled solids there is flushing liquid which still contains floating or suspended solids, since the solids containing liquid is continuously being supplied into the settling tank. For recycling the flushing liquid a storage vat is provided for the liquid from which the solids have been separated in the settling tank. At a transfer point, a filter is arranged for retaining solids. The flushing liquid is conveyed from the storage vat back to the treatment site via a feed line.

The separated solids collected in the settling tank must be removed when they take up too much of the vessel volume. Due to the flushing liquid cycle inside the equipment, a certain independence is achieved from connections of a flushing liquid system as well as a savings in liquid. A disadvantage in this arrangement, however, is the use of the filter, since the filter, as is known from experience, clogs after a relatively short working period and is no longer able to function properly. Accordingly, insufficient liquid separated from solids will reach the storage vat or the drilling operation site and the liquid introduced into the settling tank is unable to drain off and may overflow. Another problem involves the cleaning or replacement of the clogged filter which involves frequent replacement and takes up considerable time.

Therefore, it is the primary object of the present invention to provide a method of separating solids from a flushing liquid which is especially reliable and involves limited maintenance. A further object is to provide a simple and effective apparatus for carrying out the method.

In accordance with the present invention, the problems experienced in the past are avoided by introducing the flocculant to the flushing liquid before the liquid enters the settling tank.

Flocculants, particularly in the form of water-soluble polymers, such as polyacrylamides, and polyethylenimines, cause the solids to settle out of the liquid. By flocculation is meant that the primary particles, that is the solid particles, join together and form larger agglomerates, termed flocs. Because of their size, the flocs settle faster and the separation process is greatly accelerated. With the increased tendency of the solids to settle out, the flushing liquid introduced into the settling tank is free of solids in the region near the liquid level in the tank. At this location, flushing liquid, from which solids have been removed, can be withdrawn directly and recycled for further removal of solids in the flushing operation.

The flocculant can be added to the flushing liquid in liquid or solid form. It has, however, proven to be especially advantageous to flow the flushing liquid over a block of flocculant. During such flow, the flushing liquid removes the flocculant from the block to effect the desired flocculation. Flocculation is assisted by a thorough mixing of the added flocculant with the flushing liquid.

In carrying out the method, an apparatus is used including a settling tank and a feed line for introducing the liquid into the tank. A device is provided in the feed line so that the flushing liquid passes through it and receives the flocculant before it enters into the settling tank.

With the device in the feed line containing a block type flocculant, the flushing liquid necessarily passes over the flocculant before it flows into the settling tank. Due to the flocculation effect, an accelerated separation of solids is achieved and assures that at least a major part of the region adjacent the liquid level in the settling tank is free from solids. Thus, solids-free flushing liquid can be conveyed back to the flushing operation without the need for a filter or the like. The method and apparatus embodying the present invention assure continued operation until the volume of the solids separated out take up a major part of the settling tank capacity. When this situation occurs, it suffices to remove the solids so that the apparatus is ready for reuse.

In a preferred embodiment, the receiving device is located at the outlet from the feed line opening into the settling tank. In this position the replacement of the flocculant containing device can be easily effected. The flocculant containing device can be formed as a tubular adapter at the outlet from the feed line.

Another feature of the invention is the construction of the receiving device containing the flocculant as the holding basket. Preferably, the basket is laterally enclosed by the walls of the tubular adapter with an annular space between the basket and the walls. As the flushing liquid flows out of the feed line into the tubular adapter it passes over the surface of the flocculant block held in the basket and flows through the annular space between the block and the wall of the tubular adapter for entering the settling tank. During such flow, the liquid continuously remove flocculant from the block and the size of the block diminishes until it is completely consumed. The arrangement of the holding basket allows the flushing liquid to contact the entire surface of the block so that there is a sufficient removal of the flocculant. The holding basket is positioned at the entrance into the settling tank so that the flocculant is maintained above the liquid level in the tank. Accordingly, when the flushing operation is not being performed, there is no removal of flocculant by the liquid located in the settling tank.

Another feature of the preferred embodiment is the provision of a flow equalizer which smooths the stream of flushing liquid entering the member containing the flocculant block for preventing the direction of a sharp liquid jet against the block which would tend to pit it.

To afford effective mixing of the flocculant in the flushing liquid, in accordance with the present invention, a mixer is provided between the device containing the flocculant block and the settling tank. To provide a simplified arrangement, preferably the mixer is in the form of a funnel tapering inwardly toward the settling tank and arranged coaxially with the device containing the flocculant block. As the flushing liquid containing the flocculant leaves the device it flows over the conically tapered surfaces of the inner wall of the funnel, preferably in free fall, so that a mixing effect is achieved. Consequently, the mixer should be positioned relative to the settling tank or the drain from the tank so that at least a part of the inner wall of the tapering surfaces is above the liquid level within the tank, that is the level of the drain out of the tank.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing is a schematic sectional view of an apparatus embodying the present invention.

DETAIL DESCRIPTION OF THE INVENTION

In the drawing the outlet end of a feed line 1 is illustrated through which a flushing liquid is passed after it has been used in a flushing operation. A receiving device 2 is located at the outlet from the feed line 1. A unitary funnel-shaped mixer 3 is located at the lower end of the device 2 and it extends downwardly into a settling tank 4 having a drain 5 spaced intermediate the top and bottom of the tank.

Receiving device 2 is made up of a connecting hood 6 secured to the outlet end of the feed line 1 and a tubular jacket 7 depending downwardly from the hood. Within the tubular jacket 7, a holding basket 9 is suspended by stirrups 8 from the jacket. A supporting strap 11 is secured to the tubular jacket 7 and it supports the jacket on a top edge of the settling tank 4. A flocculant block 12 is located within the holding basket 9. In the connecting hood 6 aligned above the basket 9 there is a flow equalizer 13, formed, for example, of an open-cell polyurethane foam.

Flushing liquid containing dust type solids flows downwardly through the feed line 1 under relatively high pressure in the direction of the arrow A toward the flow equalizer 13. The jet-like flow of the flushing liquid is damped by the flow equalizer 13 before the liquid passes downwardly into contact with the flocculant block 12. Block 12 is spaced radially inwardly from the inner surface of the tubular jacket 7 so that an annular flow space is formed around the block. As the flushing liquid flows through this annular space it continues to contact the flocculant block 12. As a result of the flow of the flushing liquid over the surface of the block 12 flocculant is released into the liquid. The flocculant entrained in the flushing liquid flows downwardly below the device 2 into the mixer 3 where it impinges against the inside surface of the frusto-conical region 14 forming the upper part of the mixer. Accordingly, the flocculant is completely mixed with the flushing liquid. As illustrated in the drawing, as the flushing liquid continues its flow below the block 12, due to the flocculant, the solids particles tend to join together forming agglomerates 15 and, because of their size, the agglomerates quickly settle to the bottom of the tank 4. Thus, an accelerated deposition of the agglomerates 15 on the bottom of the settling tank takes place. Since the outlet 16 from the mixer 3 is located below the liquid level in the settling tank, as defined by the drain 5, the flushing liquid of the outlet 16 is free of solids and can be removed by the drain 5 in the direction of the arrow B for recycling in the flushing operation.

As can be seen in the drawing, at least a major portion of the frusto-conical region 14 within the mixer is located above the liquid level to ensure that effective mixing is achieved.

While specific embodiments of the invention have been shown and described in detail to illustrate the application of the inventive principles, it will be understood that the invention may be embodied otherwise without departing from such principles.

I claim:

1. Apparatus for separating solids from a liquid such as used in flushing out boreholes and the like drilled or cut in rock, concrete, masonry and similar materials, comprising a settling tank having a liquid level therein, a feed line for flowing the flushing liquid into the settling tank, a receiving device containing flocculant and located downstream of said feed line so that the flushing liquid from said feed line entrains the flocculant before entering the settling tank, said feed line having an outlet end, said receiving device supported at the outlet end of said feed line and arranged to convey the flushing liquid downwardly from the feed line into said settling tank, a holding basket is located within and spaced inwardly from the inner surface of said receiving device, a solid flocculant block is located within said holding basket, and a mixer is secured to and extends downwardly from said receiving device with said mixer located below said holding basket, the lower end of said mixer extends downwardly into said settling tank below the liquid level therein.

2. Apparatus, as set forth in claim 1, wherein at least the upper portion of said mixer extending downwardly from said receiving device is frusto-conically shaped converging inwardly in the direction toward said settling tank.

3. Apparatus, as set forth in claim 2, wherein a drain positioned in said settling tank intermediate the upper and lower ends thereof and said drain is located in the vertically extending range of said mixer and below the upper end of said mixer.

4. Apparatus, as set forth in claim 3, wherein said mixer includes a cylindrically shaped part extending downwardly from the lower end of said frusto-conically shaped part with said cylindrically shaped part extending downwardly below said drain from said settling tank.

5. Apparatus, as set forth in claim 1, wherein flow damping means is located in said receiving device in the path of the flushing liquid entering from the outlet end of said feed line at a position above said holding basket.

6. Apparatus, as set forth in claim 5, wherein said flow damping means comprises an open-cell polyurethane foam member positioned in said receiving device so that all of the flow of the flushing liquid entering said receiving device passes through said foam member.

7. Apparatus, as set forth in claim 6, including means within said receiving device for supporting said holding basket is disposed in axial alignment with said flow damping means.

* * * * *